Inventor
Joseph C. Spindler
by John J. Pederson
Attorney

Inventor
Joseph C. Spindler
by John J. Pederson
Attorney

Inventor
Joseph C. Spindler
by John J. Pederson
Attorney

United States Patent Office 2,915,627

Patented Dec. 1, 1959

2,915,627

LINE CORD ANTENNA COMPRISING TUNED ELEMENT COILED ADJACENT LINE CORD

Joseph C. Spindler, Chicago, Ill., assignor to Zenith Radio Corporation, a corporation of Delaware Application May 2, 1957, Serial No. 656,677

5 Claims. (Cl. 250—20)

The present invention relates to antenna systems for wave-signal receivers. It is particularly suitable for employment with broad-band very-high-frequency wave-signal receivers having balanced wave-signal input terminals but also is advantageously employed with other receivers.

Television receivers, for example, in accordance with standards established in most countries are receptive to television signals within a very wide range of frequencies; in the United States today, these signals in just the VHF band extend from 54 to 216 megacycles. It therefore becomes desirable that an antenna system for such television receivers be receptive to signals throughout this wide range.

Numerous varieties of outdoor antennas are utilized which meet these requirements with at least some satisfaction. However, since a vast number of the television receivers in use are located sufficiently near the broadcast stations normally received and substantial signal levels are therefore present within the area immediately surrounding the receiver, indoor antennas have become increasingly popular. From the now well known "rabbit ears," these indoor antenna systems have progressively become more and more complex as a result of attempts to increase the received signal level over as much of the television band as possible.

Not only are such present day indoor antenna systems relatively expensive but they are often destructive of esthetic qualities within the room in which the receiver is located. Moreover, they are usually quite bulky and thus take up considerable room generally on top of the receiver. Other approaches to the problem of providing satisfactory reception with indoor antenna systems have involved the placement of wires in various configurations around the inside of the receiver cabinet. The result has generally been unsatisfactory both from a performance and a cost standpoint.

It has heretofore been appreciated that the power cord of a wave-signal receiver itself constitutes a wave-signal interceptor usually of several electrical wavelengths at very high frequencies. Various commercial receivers receptive to restricted frequency ranges have taken advantage of this power cord pick-up by means of various coupling arrangements between the antenna terminals and the power cord. Such arrangements have usually involved several additional electrical components so as to be somewhat expensive, though generally less expensive than most external antenna systems.

One serious drawback of such prior art systems is their inherent limitation with respect to the range of frequencies adequately covered. Such system also are usually critical to adjust both at the factory and in the field. In addition, "power-line antennas" have not been of the type that are readily manufactured and sold as an accessory.

It is accordingly a general object of the present invention to provide an indoor antenna system which overcomes the foregoing deficiencies.

It is another object of the present invention to provide a new and improved antenna system which is economical to manufacture, easy to install, and electrically safe to the user.

It is a further object of the present invention to provide a new and improved power-cord antenna system which may be conveniently manufactured, sold, and installed as an accessory for wave-signal receivers.

Still another object of the present invention is to provide a new and improved power cord antenna which is receptive to television signals throughout the entire range of the VHF television band.

It is a related object of the present invention to provide an antenna system of the foregoing character which is also responsive to wave signals within a substantial portion of the ultra-high-frequency television band.

A still further object of the present invention is to provide a new and improved power-cord antenna system in which a substantial portion of interfering signals arriving by way of the power distribution system are effectually eliminated.

It is also an object of the present invention to provide a new and improved indoor antenna system which is compact and which may be completely concealed from normal viewing thus eliminating unpleasant appearing external arrays.

An antenna system constructed in accordance with the invention cooperates with a receiver having a pair of power-input terminals and a pair of wave-signal input terminals. The antenna system is receptive of wave signals within a fundamental frequency range and within a higher frequency range comprising frequencies approximating third harmonics of frequencies within the fundamental range. The system includes a conductor-pair having a bifilar portion and having another portion receptive of the wave signals. Provision is made to couple one end of the conductor pair to the power-input terminals and the other end to a source of power energization for the receiver. An electrically conductive element, of an effective electrical length of approximately three-eighths wavelength at the mid-point frequency of the fundamental frequency range, is coiled co-directionally along and contiguously with the coiled portion of the conductor pair. Finally, the system includes means for connecting points substantially at opposite ends of the conductive element individually to the wave-signal input terminals.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 1:
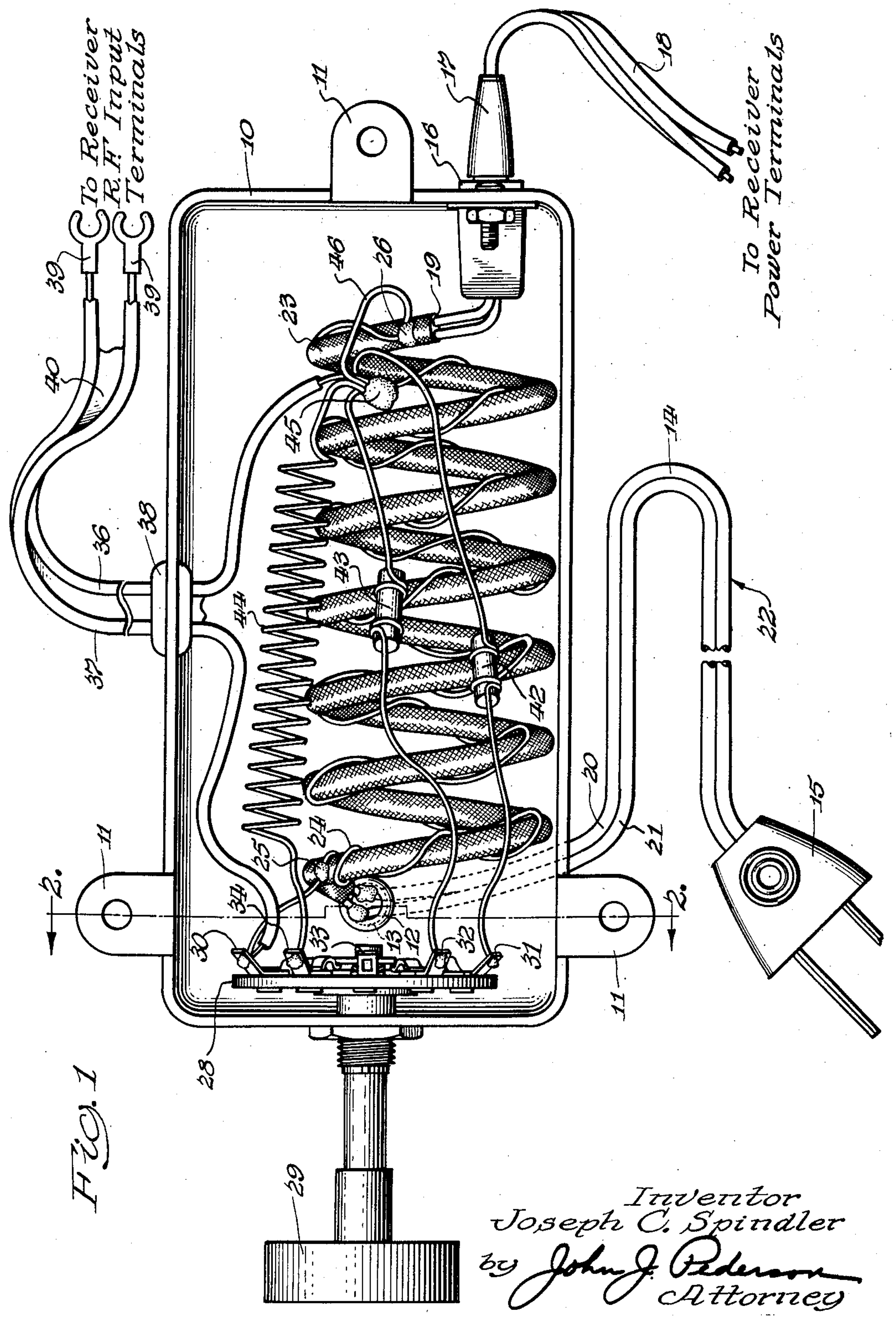
Figure 1 is a view looking at the underside of apparatus embodying the present invention.

The antenna system illustrated in Figure 1 includes a housing 10 from which project a plurality of apertured ears 11 for securing the housing to the rear panel of a wave-signal receiver such as a television receiver. Housing 10 may be of metal but preferably, for reasons of economy, is formed of a more inexpensive material such as plastic or fiber board. Extending through a rubber grommet 12 seated in an aperture 13 in the top cover of housing 10 is a conventional power cord 14 terminating in the usual plug 15. In one end of housing 10 spaced a substantial portion of the length of the housing from aperture 13 is an electrical receptacle 16 adapted to mate with the conventional plug 17 affixed on the end of the power cord 18 of a wave-signal receiver (not shown). An additional section of two-conductor power cord 19 connects the terminals within receptacle 16 individually to the ends of the two conductors 20 and 21 of power cord 14 projecting within housing 10. Thus, as far as supplying energization to an associated receiver is concerned, power cords 14, 18 and 19 together constitute one single power cord 22 for the receiver and these individual parts thereof are therefore conveniently referred to as portions 14, 18 and 19 of one single power cord; it will become obvious that these portions could indeed comprise a single unitary power cord of the conventional type normally employed in such services.

Power cord portion 19 is coiled throughout its length and lies entirely within housing 10. Coaxially ensheathing bifilar portion 19 is an electrically-conductive cylinder 23 which conveniently is of a stranded-wire metal braid of the type often utilized for wire-shielding purposes in communications equipment. In order to retain the thus ensheathed portion of the power cord in its coiled form, a stiff wire 24 is spiraled around the braid from one end to the other, the two ends of wire 24 being secured to the ends of braid 23 by solder joints 25 and 26.

Disposed adjacent the end of housing 10 opposite receptacle 16 is a wafer switch 28 the shaft of which projects through and outwardly of the housing and is provided with a knob 29. Switch 28, as shown in Figure 2, is conventional and provides for the connection of a primary terminal 30 selectively to either of four secondary terminals 31, 32, 33 or 34.

The ends of still another pair of conductors 36 and 37 enter housing 10 through a grommet 38 disposed in one side of the housing. The end of conductor 36 is electrically connected to one end of braid 23 at solder joint 26. The end of conductor 37 is electrically connected to primary switch terminal 30 which in turn is connected to the end of braid 23 at solder joint 25. Secured to the opposite ends of conductors 36 and 37 are spade lugs 39 for convenient connection to the wave-signal or R.F. input terminals of the associated receiver. Conductors 36 and 37 are preferably joined together by a common dielectric covering 40, an antenna lead construction conventionally utilized for supplying wave-signal energy to television receivers.

Electrically connected between switch terminal 31 and the end of braid 23 at solder joint 26 is a capacitor 42. Another capacitor 43 is electrically connected between switch terminal 32 and the same end of braid 23 as capacitor 42. Also connected to the latter end of the braid is one end of an inductor 44 connected at its other end to switch terminal 34. Switch terminal 33 remains disconnected. Rotation of knob 29 therefore selectively connects the different lumped reactances comprising capacitors 42, 43 and inductor 34 across the opposite ends of braid 23; alternatively, switch terminal 33 may be selected whereby none of the lumped reactances are electrically connected into the system. As indicated in Figure 1, the electrically common ends of the lumped reactances and conductor 36 are all joined together by a mass of solder 45 which in turn is connected by a wire 46 to solder joint 26; any other suitable connection arrangement may of course be utilized.

Figures 2, 3:
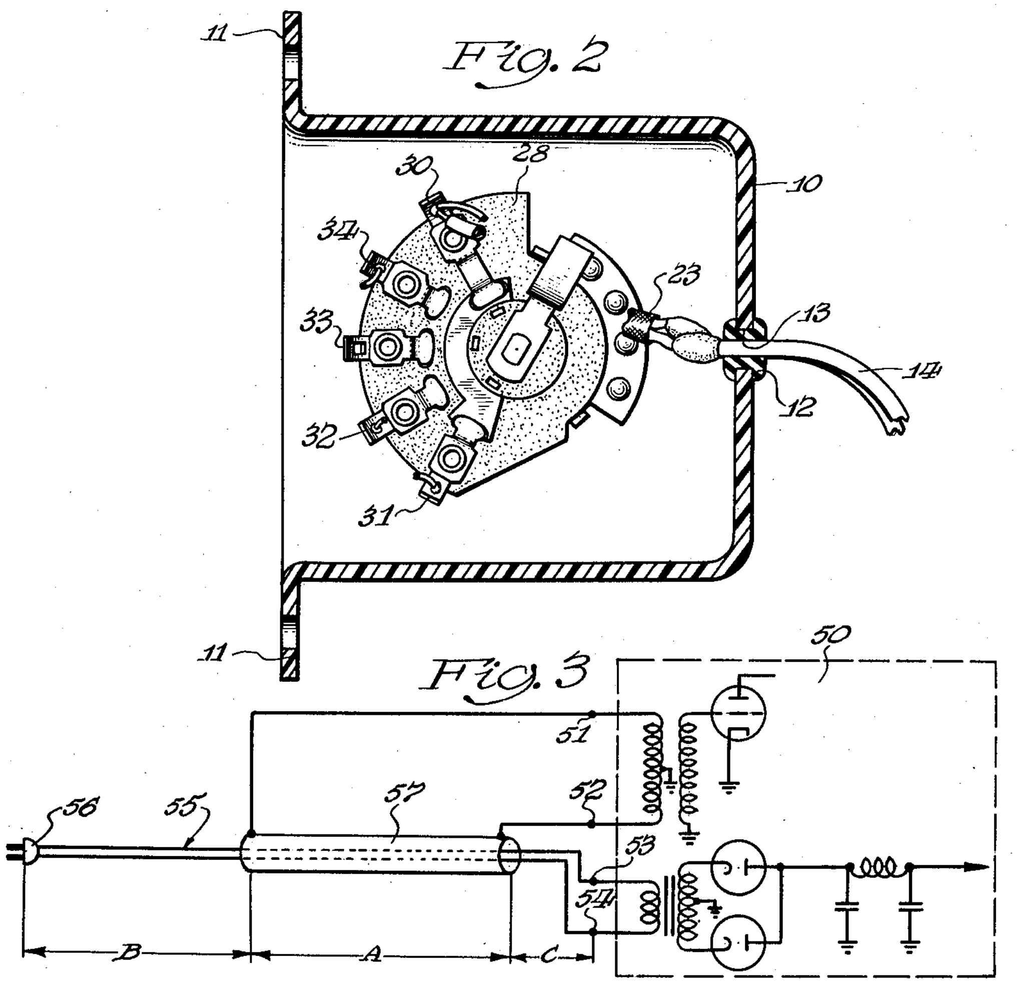
Figure 2 is a cross-sectional view taken along line 2—2 in Figure 1.
Figure 3 is a schematic circuit diagram of one embodiment of the present invention coupled to a wave-signal receiver.

Figure 3 schematically depicts apparatus, similar to that shown in Figure 1 but without switch 28 or the lumped reactances, connected to a wave-signal receiver 50 which includes a pair of wave-signal input terminals 51 and 52 and a pair of power-input terminals 53 and 54. In the preferred embodiment, wave signal input terminals 51 and 52 constitute the radio-frequency input terminals of a television receiver and present an impedance of 300 ohms balanced with respect to the chassis. Power-input terminals 53 and 54 are coupled to a source of energization (not shown) for the receiver by a two-conductor power cord 55 terminating in a suitable plug 56. Coaxially ensheathing power cord 55 is an electrically conductive coaxial cylinder 57. Wave-signal input terminals 51 and 52 are coupled individually to points spaced longitudinally on cylinder 57 and preferably to opposite ends thereof as shown. While the portion of power cord 55 within cylinder 57 preferably is coiled like portion 19 of Figure 1, it may have other configurations and in particular may be straight. In order to develop a substantial signal voltage across the ends of cylinder 57 while at the same time enabling the cylinder to present an impedance suitably matched with the impedance across wave-signal input terminals 51 and 52, cylinder 57 is of an effective electrical length A preferably greater than one-fourth and less than one-half wavelength at substantially all frequencies within the range of frequencies to be received.

Maximum signal voltage is obtained in the portion of cylinder 57 across which terminals 51, 52 are connected is electrically of a length equal to one-half wavelength at the received frequency. However, the impedance presented by such a length is substantially more than that presented by the wave-signal input terminals with resulting poor energy transfer. The impedance is substantially reduced if cylinder 57 correspond to one-fourth wavelength, but the signal voltages have noticeably decreased amplitudes at such a length. An efficient compromise results by selecting a length for the active portions of the cylinder corresponding to greater than one-fourth but less than one-half wavelength; very satisfactory performance is obtained when cylinder 57 has an effective electrical length corresponding to approximately three-eighths wavelength; as the length is shortened from one-half wavelength, the impedance level begins to fall more rapidly than the voltage level so that substantial voltages may be obtained at reasonable impedances such as the 300 ohms conventionally presented by television receiver input terminals.

The electrical length of the cylinder is of course longer than its physical length since the velocity of propagation in such materials as are utilized is less than that in free space. Moreover, the voltages and impedances will be the same at a plurality of different electrical lengths because of the repetition of voltage and impedance maxima along a line of greater than the minimum length; equivalent voltage and impedance characteristics exist between one-half and three-fourths wavelength, between three-fourths and one wavelength, and so on. In each electrical quarter-wave segment progressively further from a reference point such as one end of the cylinder, there exists a point presenting a substantial voltage at a conveniently utilizable impedance. Accordingly, the effective electrical length of the cylinder is the same for a plurality of different actual electrical and corresponding physical lengths.

In operation, wave-signal energy intercepted by the portion of power cord 55 external to cylinder 57 is transferred to the cylinder which in turn is coupled to the input circuitry of the receiver. The wave-signal intercepting portion of the power cord is preferably of at least one-half effective electrical wavelength at the received frequencies; the intercepting portion comprises both that portion of length B between plug 56 and the cylinder and the portion of length C between the cylinder and power input terminals 53 and 54. Since the power supply in most receivers is effectively grounded at some point electrically near power input terminals 53 and 54, it is also preferred that length C be at least one-fourth wavelength at the received frequencies so as to avoid substantial influence by the power-supply on the balance of the receiver wave-signal input circuitry. However, very satisfactory operation may be obtained with length C diminished to substantially less the one-fourth wavelength in which case it becomes highly preferable to construct length B of at least one-half effective electrical wavelength to obtain efficient wave-signal interception.

Figure 4:
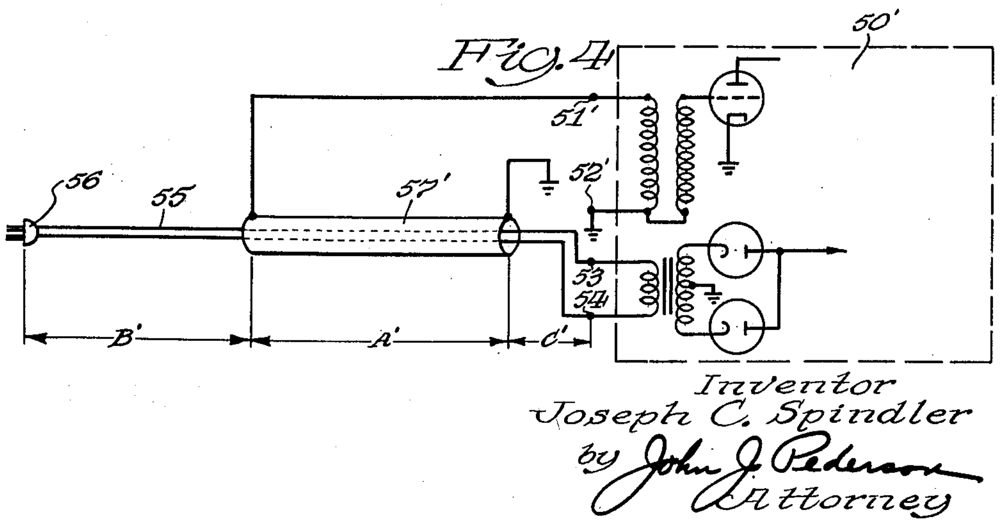
Figure 4 is a schematic circuit diagram showing a coupling arrangement alternative to that shown in Figure 3.

The apparatus schematically shown in Figure 4 is similar to that in Figure 3 except that wave-signal input terminals 51' and 52' of receiver 50' are unbalanced or single-ended with terminal 52' being connected to a point of reference potential such as chassis ground. In this instance, one end of a similarly constructed cylinder 57' is connected to chassis ground while the opposite end is coupled to input terminal 51'. Again, the length A' of the cylinder is selected to present a substantial voltage lengthwise across the cylinder while at the same time achieving an impedance thereacross preferably approximating that appearing across the input terminals so as to obtain maximum energy transfer.

The present invention is primarily concerned with a system for deriving energy from a conductor disposed in space to intercept wave signals to be received. The power cord of a television receiver constitutes such an intercepting conductor, and at conventional VHF television frequencies, for example, the power cord is essentially a single conductor and may be visualized simply as a multi-strand wire. The typical power cord is about eight feet in length and therefore constitutes approximately one-half wavelength at VHF television channel 2, for example.

In accordance with the preferred form of the present invention, the wave-signal input terminals of the receiver are coupled across a lengthwise portion of the power cord by distributed inductive and capacitive reactances; the inventive system is capable of providing substantial signal energy over a wide frequency range such as over the entire VHF television band. This is most readily and economically achieved by the simple provision of braid 23 coaxially ensheathing portion 19 of the power cord, braid 23 corresponding to cylinder 57 of Figure 3. With braid 23 or cylinder 57 having an effective electrical length of approximately ⅜ wavelength at the midpoint of the fundamental frequency range to be received, it has been found that substantial wave-signal energy is transferred from the power cord to the wave-signal input terminals throughout the entire frequency range. Contributing to this broad-band performance is the inherently low Q of the apparatus constructed in accordance with the present invention. This is achieved by distributing the reactances involved as well as by the use of conventional and economical materials throughout, the dielectric properties of which effectually constitute braid 23 and power cord portion 19 as a line transformer. When, as is preferable, the line transformer is electrically spaced by at least one-fourth wavelength from the chassis, the latter has little if any influence upon the condition of balance existing across the wave-signal input terminals. Coiling power cord portion 19 not only aids in compacting the entire assembly but also contributes additional inductance to the system which aids in obtaining a better energy transfer in the lower frequency portion of the received frequency range, other parameters being optimized for best overall performance.

While the apparatus shown schematically in Figures 3 and 4 produces very substantial energy transfer between the power cord and the wave-signal input terminals over a wide frequency range, it nevertheless represents some compromise. At the end regions of the band, the impedance across braid 23 includes a reactive component, inductive at the lower frequencies and capacitive at the higher frequencies. This may be readily compensated as shown schematically in Figures 5, 6 and 7.

Figure 5:
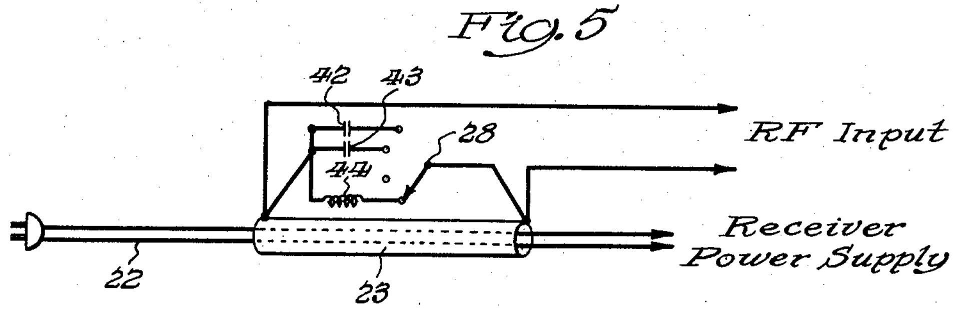
Figure 5 is a schematic circuit diagram of another embodiment of the present invention.

Figure 5 corresponds to Figure 1 and includes power cord 22, conductive cylinder or braid 23 and suitable connecting leads for coupling the power cord and the braid respectively to the power-input terminals and the signal-input terminals. Selectively coupled across the opposite ends of braid 23 by means of switch 28 are capacitor 42, capacitor 43, and inductor 44, with a fourth position on switch 28 being open. At low frequencies, capacitor 42 is electrically connected across the ends of braid 23 thereby compensating for inductive reactance presented across braid 23 at frequencies substantially lower than that at which braid 23 is effectively approximately ⅜ of an electrical wavelength. At frequencies substantially higher than that to which the braid length is centered, the impedance across the braid includes a capacitive component and inductor 44 is switched in parallel with the braid to neutralize that capacitance.

Figure 6:
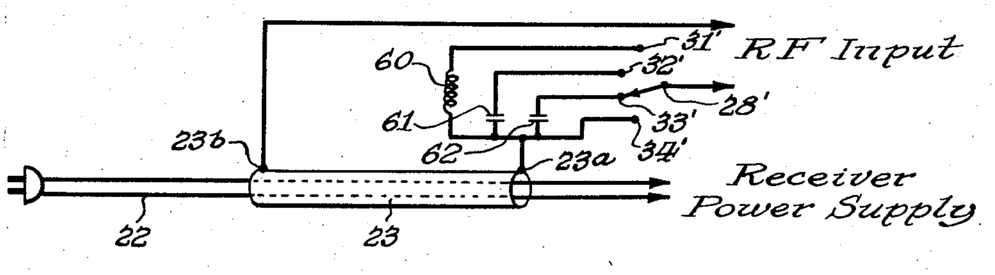
Figure 6 is similar to Figure 5 but shows an alternative arrangement thereof.

Alternatively, similar lumped reactances may be selectively connected in series between one of the wave-signal input terminals and one end of braid 23 as shown in Figure 6. In this instance, the primary terminal of wafer switch 28' is selectively connected to four secondary terminals 31', 32', 33' and 34'. An inductor 60 and capacitors 61 and 62 are respectively connected between terminals 31', 32' and 33' and one end 23*a* of braid 23. The other end 23*b* of the braid is electrically connected to the other of the wave signal or R.F. input terminals. Terminal 34' is directly connected to braid end 23*a*. The length of braid 23 corresponds to three-eighths of a wavelength at a frequency midway in the range of frequencies to be received and at such frequency switch 28' would connect terminal 34' to the receiver. At lower frequencies, capacitors 61 or 62 are connected in series with the cylinder by turning the switch to terminal 32' or 33'. At higher frequencies, inductor 60 is connected into the series circuit.

Figure 7:
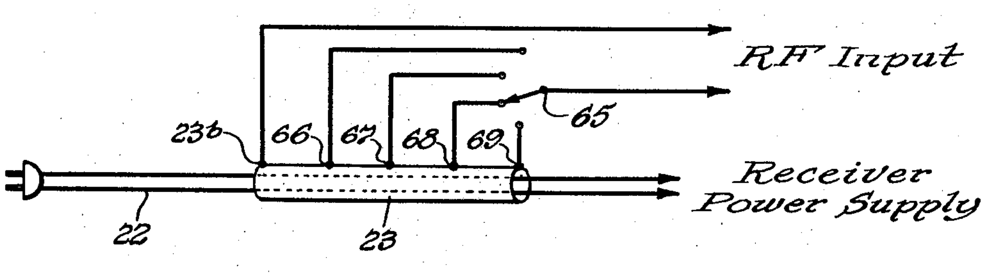
Figure 7 is also similar to Figure 5 but shows still another alternative arrangement.

Still another arrangement for compensating for reactive components in the impedance presented longitudinally across braid 23 is illustrated in Figure 7. In this instance, one wave-signal input terminal is electrically connected to braid end 23*b*. The other wave-signal input terminal is connected through a switch 65 selectively to a plurality of points 66, 67, 68 and 69 spaced progressively at increasing distances longitudinally of cylinder 23 from end 23*b*. Accordingly, in the low-frequency portion of the band point 69 is connected to the receiver by switch 65. As a higher frequency is to be received, switch 65 is turned to select point 68, for example. Thus, the length of cylinder 23 utilized for signal transfer is selectively adjusted to correspond electrically to approximately three-eighths of a wavelength at the frequency being received, thereby providing nearly optimum transfer at any selected frequency.

In any of the circuit arrangements illustrated in Figures 5, 6 and 7, it is not necessary for services such as present day commercial television to provide a selector switch position corresponding to each of the 13 VHF television channels. First of all, as pointed out before, the preferred construction is inherently sufficiently broad band that very little difference is seen performance-wise in optimizing the reactance compensation at every channel or even at every second or third channel. Another convenient factor present with U.S. television standards is the approximate three to one frequency relation of the channels in the low and high frequency portions of the VHF frequency range; if braid 23 has an effective electrical length of one-fourth wavelength at some low-frequency channel such as channel 4, it will have an effective length of approximately three-fourths wavelength on a corresponding high-frequency channel such as channel 12. From a standpoint of energy transfer, the latter length is effectively the same as the former. Therefore, compensation at two or three channels throughout the low frequency portion also provides compensation throughout the higher frequency portion of the overall frequency range.

An interesting feature of the apparatus of the present invention is its performance on the ultra-high-frequency television bands. At such frequencies the length of the line transformer is several wavelengths, and as a result three or four relatively weak energy transfer frequency regions are encountered throughout the extent of the ultra-high-frequency range. In most instances, these do not coincide with the scattered frequencies at which local UHF broadcasting stations operate. However, with the addition of the auxiliary compensating networks illustrated in Figures 5, 6 and 7, these weak regions can be shifted in frequency by switching in different ones of the lumped reactances so as to avoid correspondence of a weak transfer region with the channel frequency of a particular local station.

Results obtained with the antenna have been consistently superior to those provided by conventional indoor antennas with fixed orientation, and almost invariably better than the best results obtainable with "rabbit-ear" antennas even with extensive re-orientation and re-positioning of the latter for optimum results. It has been found that orientation of the present antenna is not at all critical and ordinarily no attention need be given to the routing of the power cord to the service receptacle. The antenna of the present invention is also virtually independent of variations in physical wiring installations of the building housing the receiver with which it is used.

Moreover, the apparatus may be rigidly affixed to the receiver cabinet in an inconspicuous manner, since the portion within housing 10 may be in any orientation and may even be concealed within the metal cabinet of typical portable receivers; on the other hand, the apparatus may conveniently be sold as an accessory and may be attached to any convenient part of a receiver internal or external to the cabinet or it may be set elsewhere. When incorporated within the cabinet, housing 10 may of course be dispensed with. The housing is not necessary, except possibly for appearance or mechanical purposes, since the unit is electrically safe, there being no conductive connection between the power cord and the antenna terminals.

The apparatus and system disclosed is extremely simple, compact, and economical of construction. Its economy its enhanced by the desirability of using inexpensive and common materials which are not only more economical but also contribute to the low Q and thus broad-band operation of the system. Power cord portion 19 and sheath 23 may be supported in the preferred coiled configuration in a variety of manners such as by a wooden or plastic dowel, or may be self-supporting thus eliminating supporting wire 24. For many applications, entirely satisfactory operation is obtained without the need for additional compensating lumped reactances as is schematically illustrated in Figures 3 and 4. Isolation of the coupling arrangement is enhanced by electrically spacing the same away from the receiver power supply, preferably by at least one-fourth wavelength at the frequencies received. Very satisfactory performance has been observed simply by utilizing conventional eight-foot television receiver power cords for each of power cord portions 14 and 18 of Figure 1.

In a typical embodiment of the present invention constructed as shown in Figure 1, power cord portion 19 is a piece of conventional two-conductor rubber covered receiver line cord 22½ inches long physically which corresponds to an electrical length of fifty inches. Portion 19 is formed into a coil about one inch in diameter and 2¾ inches long. Power cords (portions) 14 and 18 are each 96 inches long, being the conventional receiver line cords previously mentioned. Capacitor 42 is 20 mmfds., capacitor 43 is 10 mmfds. and inductor 44 is 0.25 microhenry. Conductors 36 and 37 are spaced to have a characteristic impedance of 300 ohms.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. For a receiver having a pair of power-input terminals and a pair of wave-signal input terminals, an antenna system receptive of wave signals within a fundamental frequency range and within a higher frequency range comprising frequencies approximating third harmonics of frequencies within said fundamental frequency range, said system comprising: a conductor-pair having a coiled bifilar portion and having another portion receptive of said wave signals; means for coupling one end of said conductor pair to said power-input terminals; means for coupling the other end of said conductor pair to a source of power energization for said receiver; an electrically conductive element of an effective electrical length of approximately three-eighths wavelength at the mid-point frequency of said fundamental frequency range, coiled co-directionally along and contiguously with said coiled portion of said conductor pair; and means for connecting points substantially at opposite ends of said conductive element individually to said wave-signal input terminals.

2. For a receiver having a pair of power-input terminals and a pair of wave-signal input terminals, an antenna system receptive of wave signals within a fundamental frequency range and within a higher frequency range comprising frequencies approximating third harmonics of frequencies within said fundamental frequency range, said system comprising: a conductor-pair having a coiled bifilar portion and having another portion receptive of said wave signals; means for coupling one end of said conductor pair to said power-input terminals; means for coupling the other end of said conductor pair to a source of power energization for said receiver; an electrically conductive element, of an effective electrical length of approximately three-eighths wavelength at the mid-point frequency of said fundamental frequency range, coiled co-directionally along and coaxially ensheathing said coiled portion of said conductor pair; and means for connecting points substantially at opposide ends of said conductive element individually of said wave-signal input terminals.

3. For a receiver having a pair of power-input terminals and a pair of wave-signal input terminals, an antenna system receptive of wave signals within a fundamental frequency range and within a higher frequency range comprising frequencies approximating third harmonics of frequencies within said fundamental frequency range, said system comprising: a conductor-pair having a coiled bifilar portion and having another portion receptive of said wave-signals; means for coupling one end of said conductor pair to said power-input terminals; means for coupling the other end of said conductor pair to a source of power energization for said receiver; an electrically conductive element, of an effective electrical length of approximately three-eighths wavelength at the mid-point frequency of said fundamental frequency range, coiled co-directionally along and contiguously with said coiled portion of said conductor pair and spaced from each of the ends of said conductor pair by an effective electrical distance of at least one-fourth wavelength at said mid-point frequency; and means for connecting points substantially at said opposite ends of said conductive element individually to said wave-signal input terminals.

4. For a receiver having a pair of power-input terminals and a pair of wave-signal input terminals, an antenna system receptive of wave signals within a fundamental frequency range and within a higher frequency range comprising frequencies approximating third harmonics of frequencies within said fundamental frequency range, said system comprising: a conductor-pair having a coiled bifilar portion and having another portion receptive of said wave signals; means for coupling one end of said conductor pair to said power-input terminals; means for coupling the other end of said conductor pair to a source of power energization for said receiver; an electrically conductive element, of an effective electrical length of approximately three-eighths wavelength at the mid-point frequency of said fundamental frequency range, coiled co-directionally along and contiguously with said coiled portion of said conductor pair and spaced from said other end of said conductor pair by an effective electrical distance of at least one-half wavelength at said mid-point frequency; and means for connecting points substantially at opposite ends of said conductive element individually to said wave-signal input terminals.

5. For a receiver having a pair of power-input terminals and a pair of wave-signal input terminals presenting a predetermined impedance, an antenna system receptive of wave signals within a fundamental frequency range and within a higher frequency range comprising frequencies approximating third harmonics of frequencies within said fundamental frequency range, said system comprising: a conductor-pair having a bifilar coiled portion and having another portion receptive of said wave signals; means for coupling one end of said conductor pair to said power-input terminals; means for coupling the other end of said conductor pair to a source of power energization for said receiver; an electrically conductive element, of an effective electrical length of approximately three-eighths wavelength at the mid-point frequency of said fundamental frequency range, coiled co-directionally along and contiguously with said coiled portion of said conductor pair; and means for connecting points substantially at opposite ends of said conductive element individually to said wave-signal input terminals and comprising means for selectively varying the effective electrical length of said conductive element to maintain said length approximating three-eighths wavelength at all selected frequencies within said fundamental frequency range and to maintain the impedance of said portion approximating said predetermined impedance at said selected frequencies.

References Cited in the file of this patent

UNITED STATES PATENTS

| | | |
|---|---|---|
| 1,922,335 | Sobocinski | Aug. 15, 1933 |
| 1,970,986 | Tamol | Aug. 21, 1934 |
| 2,520,811 | Reid | Aug. 29, 1950 |
| 2,581,983 | Thompson | Jan. 8, 1952 |
| 2,611,080 | Brough | Sept. 16, 1952 |
| 2,611,082 | Anderson | Sept. 16, 1952 |

FOREIGN PATENTS

| | | |
|---|---|---|
| 702,525 | Great Britain | Jan. 20, 1954 |
| 45,897 | France | Oct. 7, 1935 |